US009128796B2

(12) United States Patent
Chitre et al.

(10) Patent No.: US 9,128,796 B2
(45) Date of Patent: Sep. 8, 2015

(54) ENABLING A WIRELESS DEVICE TO ACT AS A RELAY FOR UPGRADING AN ACCESSORY COUPLED TO THE WIRELESS DEVICE

(75) Inventors: Monica Chitre, Watchung, NJ (US); Yoganand Rajala, Alpharetta, GA (US)

(73) Assignee: Cellco Partnership, Basking Ridge, NJ (US)

(*) Notice: Subject to any disclaimer, the term of this patent is extended or adjusted under 35 U.S.C. 154(b) by 98 days.

(21) Appl. No.: 13/601,383

(22) Filed: Aug. 31, 2012

(65) Prior Publication Data

US 2014/0068592 A1    Mar. 6, 2014

(51) Int. Cl.
*G06F 9/44* (2006.01)
*G06F 9/445* (2006.01)

(52) U.S. Cl.
CPC ... *G06F 8/65* (2013.01); *G06F 8/60* (2013.01); *G06F 8/61* (2013.01); *G06F 9/4411* (2013.01)

(58) Field of Classification Search
CPC .................................................. G06F 8/60–8/78
See application file for complete search history.

(56) References Cited

U.S. PATENT DOCUMENTS

| | | | | |
|---|---|---|---|---|
| 6,732,195 B1* | 5/2004 | Baldwin | ............................ | 710/6 |
| 8,024,723 B2* | 9/2011 | Nahm et al. | ................... | 717/172 |
| 8,254,993 B2* | 8/2012 | Bolton et al. | ................. | 455/557 |
| 2004/0009777 A1* | 1/2004 | Koskimies et al. | ........ | 455/456.1 |
| 2005/0039178 A1* | 2/2005 | Marolia et al. | ................ | 717/168 |
| 2006/0026304 A1* | 2/2006 | Price | ................................. | 710/8 |
| 2008/0071935 A1* | 3/2008 | Ohta | ................................ | 710/10 |
| 2008/0259844 A1* | 10/2008 | Richeson et al. | ............. | 370/328 |
| 2009/0044185 A1* | 2/2009 | Krivopaltsev | .................. | 717/173 |
| 2009/0138868 A1* | 5/2009 | Vanover et al. | ................ | 717/171 |
| 2009/0172658 A1* | 7/2009 | Wood et al. | ..................... | 717/174 |
| 2009/0293052 A1* | 11/2009 | Kim | .............................. | 717/174 |
| 2010/0169875 A1* | 7/2010 | Stewart | ......................... | 717/170 |
| 2010/0313194 A1* | 12/2010 | Juneja | ............................ | 717/171 |
| 2010/0329181 A1* | 12/2010 | Lan | ................................ | 370/328 |
| 2010/0333082 A1* | 12/2010 | Keys et al. | ..................... | 717/173 |
| 2011/0179405 A1* | 7/2011 | Dicks et al. | .................... | 717/168 |
| 2011/0289497 A1* | 11/2011 | Kiaie et al. | ..................... | 717/171 |
| 2012/0117557 A1* | 5/2012 | Li | ................................. | 717/173 |
| 2012/0124570 A1* | 5/2012 | Alberth et al. | ................. | 717/173 |
| 2012/0192173 A1* | 7/2012 | Price | ............................. | 717/172 |
| 2013/0227540 A1* | 8/2013 | Ruster et al. | ................... | 717/170 |

FOREIGN PATENT DOCUMENTS

EP    1672938 A1 *    6/2006    .............. G06F 9/445

OTHER PUBLICATIONS

Westfall, John, "Updating Your Phone", 2011, pp. 423-438.*
Piyare, Rajeev, et al., "Bluetooth Based Home Automation System Using Cell Phone", 2011, pp. 192-195.*

(Continued)

*Primary Examiner* — Thuy Dao
*Assistant Examiner* — Christopher Franco

(57) ABSTRACT

A system and method for updating an accessory device are described. A software upgrade for upgrading an accessory device is received from a wireless network at a wireless device. In response, it is automatically determined at the wireless device whether the accessory device is in communication with the wireless device. Upon determining that the accessory device is in communication with the wireless device, the software upgrade is forwarded from the wireless device to the accessory device to enable upgrade of the accessory device according to the software upgrade.

19 Claims, 6 Drawing Sheets

(56) References Cited

OTHER PUBLICATIONS

Ma, Jun, et al., "Device Management in the IMS", 2008, pp. 47-62.*

Zeng, Zhe, et al., "Navigation Map Update Framework under Beidou RDSS Mechanism", 2013, pp. 1-5.*

Kim, Jinsik, et al., "Remote Progressive Firmware Update for Flash-Based Networked Embedded Systems", 2009, pp. 407-412.*

Nilsson, Dennis K., et al. "Secure Firmware Updates Over the Air in Intelligent Vehicles", 2008, pp. 380-384.*

* cited by examiner

US 9,128,796 B2

ENABLING A WIRELESS DEVICE TO ACT AS A RELAY FOR UPGRADING AN ACCESSORY COUPLED TO THE WIRELESS DEVICE

TECHNICAL FIELD

The present subject matter relates to enabling a wireless device to act as a relay for upgrading an accessory coupled to the wireless device.

BACKGROUND

Traditionally, Firmware Over the Air (FOTA) servers upgrade wireless devices over the air. However, there is no mechanism to upgrade an accessory or a device that is attached to the wireless device over the air. The accessory or the attached device would need to have its own wireless connection to a wireless network to upgrade over the air. Hence, a need exists to enable the accessory or the attached device to perform an upgrade without having its own wireless capability.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipment for using a wireless device as a relay server for the accessory/attached device. In one implementation, a software image that will be uploaded to the FOTA server will be a combined image with both the wireless device and accessory/attached device software combined into one. Once the file is downloaded to the wireless device, the file may be unpacked into the individual components and the accessory/attached device software will be sent via a File Transfer Protocol (FTP) (e.g., Trivial FTP (TFTP)). Once file transfer completes, the accessory/attached device may perform a software upgrade. The results to the FOTA server may be based on successful upgrades for the wireless device and accessory/attached device.

Figure 1:
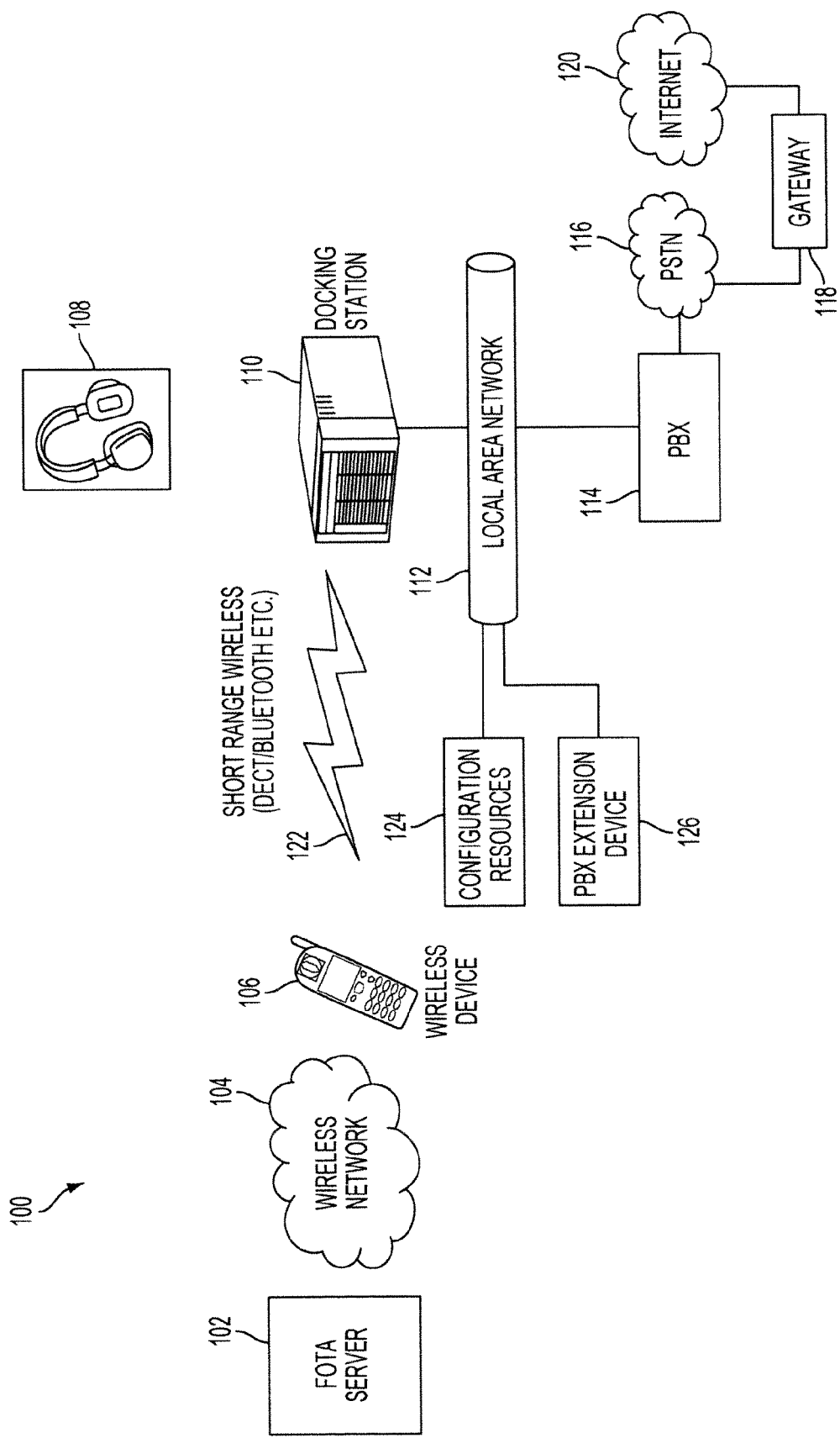
FIG. 1 illustrates an exemplary system for allowing a wireless device to function as a relay server between a FOTA server and an accessory device in communication with the wireless device.

Reference now is made in detail to the examples illustrated in the accompanying drawings and discussed below. FIG. 1 illustrates an exemplary system 100 for allowing a mobile device to act as a relay server for upgrading software of its accessories. The system 100 includes a FOTA server 102, a wireless network 104, a wireless device 106, accessory devices 108 and 110, a local area network 112, a private branch exchange (PBX) system 114, a public switched telephone network (PSTN) 116, a gateway 118, and an Internet 120.

The FOTA server 102 may include software or programming upgrade for the wireless device 106. The software upgrade may be in the form of executable code and/or associated data that is carried on or embodied in a type of machine readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software upgrade may at times be communicated through the wireless network 104 to the wireless device 106. The software upgrade may include a combined software upgrade for the wireless device 106 and the accessory devices 108, 110. Alternatively, the software upgrade may include a combined software upgrade for the accessory devices 108, 110. Alternatively, the software upgrade may include a combined software upgrade for the wireless device 106 and one of the accessory devices 108, 110. In either case, the FOTA server 102 forwards the software upgrade to the wireless device 106 over the wireless network 104.

The wireless network 104 provides mobile wireless communications services to the wireless device 106 as well as to other mobile stations (not shown), for example, via a number of base stations (not shown). The present techniques may be implemented in any of a variety of available wireless networks 104 and/or on any type of mobile station compatible with such a wireless network 104, and the drawing shows only a very simplified example of the wireless network 104 for purposes of discussion here.

The wireless network 104 might be implemented as a network conforming to the code division multiple access (CDMA) IS-95 standard, the 3rd Generation Partnership Project 2 (3GPP2) wireless IP network standard or the Evolution Data Optimized (EVDO) standard, the 4G network, the Global System for Mobile (GSM) communication standard, a time division multiple access (TDMA) standard or other standards used for public mobile wireless communications. The wireless device 106 may be capable of voice telephone communications through the wireless network 104, and for functioning as a relay device, the wireless device 106 is capable of data communications through the particular type of wireless network 104 (and the user thereof typically will have subscribed to data service through the wireless network 104).

The wireless network 104 allows the user of the wireless device 106 to initiate and receive telephone calls to other users as well as through the PSTN 116. The wireless network 104 can be implemented by a number of interconnected networks. Hence, the overall wireless network 104 may include a number of radio access networks (RANs), as well as regional ground networks interconnecting a number of RANs and a wide area network (WAN) interconnecting the regional ground networks to core network elements. A regional portion of the wireless network 104, such as that serving wireless device 106, can include one or more RANs and a regional circuit and/or packet switched network and associated signaling network facilities.

Physical elements of a RAN operated by one of the mobile service providers or carriers include a number of base stations, as mentioned above. Each base station can include a base transceiver system (BTS), which can communicate via an antennae system at the site of the base station and over the airlink with the wireless device 106, when the wireless device 106 is within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 104, which carries the user communications and data for the wireless device 106 between the base stations and other elements with or through which the mobile stations communicate. The wireless network 104 can also include other elements that support functionality other than device-to-device media transfer services such as messaging service messages and voice communications. Specific elements of the wireless network 104 for carrying the voice and data traffic and for controlling various aspects of the calls or sessions through the wireless network 104 are omitted here for simplicity. It will be understood that the various network elements can communicate with each other and other aspects of the wireless network 104 and other networks (e.g., PSTN 116 and the Internet 120) either directly or indirectly.

The wireless device 106 can receive and execute applications written in various programming languages, as discussed more later. The wireless device 106 can take the form of portable handsets, smart-phones or personal digital assistants, although it may be implemented in other form factors. Program applications, including an application to assist in upgrading the software at the wireless device 106 and at the accessory devices 108, 110 and/or any application can be configured to execute on many different types of wireless device 106. For example, a wireless device application can be written to execute on a binary runtime environment for (BREW-based) wireless device, a Windows Mobile based wireless device, Android, I-Phone, Java Mobile, or RIM based wireless device such as a BlackBerry or the like. Some of these types of devices can employ a multi-tasking operating system.

The wireless device 106 communicates over the air with a base station and through the wireless network 104 for various voice and data communications with the FOTA server 102. If the system 100 offers the capability of upgrading the accessories 108, 110 through the wireless device 106 (hereafter referred to as upgrade relay service), the service may be hosted on the FOTA server 102 and the wireless device 106. Alternatively, the upgrade relay service may be provided by a separate entity (alone or through agreements with the carrier), in which case, the service may be hosted on another server in communication with the wireless network 104. The FOTA server 102 may provide any of a variety of common application or service functions in support of or in addition to an application program running on the wireless device 106. However, for purposes of further discussion, we will focus on functions thereof in support of the mobile upgrade relay service.

To this end, the wireless device 106 may receive from the FOTA server 102 through the wireless network 104 a combined software upgrade package for the wireless device 106, the accessory device 108, and/or the accessory device 110. The combined software upgrade package may contain a complete package of a new version of the software or may contain an incremental package of the new version of the software. Upon receiving the software upgrade, the wireless device 106 may automatically determine whether the accessory device for which the upgrade is available is in communication with the wireless device 106. Upon determining the accessory device is in communication with the wireless device 106, the wireless device 106 may forward the software upgrade to the accessory device to upgrade the accessory device according to the software upgrade. The wireless device 106 may receive from the accessory device, a notification of an upgrade success or an upgrade failure and may forward such notification to the FOTA server 102.

In one implementation, the software upgrade received from the FOTA server 102 at the wireless device 106 may be a combined software upgrade—one for the wireless device 106 and one for one (or each) of the accessory devices 108, 110. In one implementation, the software upgrade for the wireless device 106 and for one (or each) of the accessory devices 108, 110 may be combined by zipping the images associated with each software upgrade into a single zip file with a descriptor providing details of which image is associated with the wireless device 106 and which image is associated with the accessories 108, 110. In this case, the wireless device 106 may determine that the software upgrades are bundled together and in response unpack the software upgrade to its individual components and may upgrade its software in accordance with the software upgrade for the wireless device 106. The wireless device 106 may also forward to the accessory device the software upgrade associated with the accessory device.

In one implementation, the wireless device 106 reviews the download descriptor associated with the software upgrade received from the FOTA server 102 and determines that the software upgrade is both for the wireless device 106 and the accessory device. The downloads descriptor may identify the devices associated with the upgrade (e.g., the wireless device 106 and the accessory device). After reviewing the descriptor, the wireless device 106 may set an accessory upgrade available flag and may upgrade the software modules of the wireless device 106. Prior to informing the user that the software upgrade is complete, the wireless device 106 reviews the accessory upgrade available flag and upon determination that it is set it will proceed with upgrading the accessory device associated with the software upgrade. To this end, the wireless device 106 pushes the software upgrade to the accessory device and instructs the accessory device to upgrade its software. Upon receiving confirmation from the accessory device that the upgrade has been performed, the wireless device 106 informs the user the software upgrade is complete. The processes associated with upgrading the software modules of the wireless device 106 and the accessory device are described in more details with respect to FIGS. 2-3B.

The accessory devices 108, 110 may be devices that communicate over short range wireless communication 122 with the wireless device 106. In one implementation, the accessory device is an accessory for the wireless device 106 and does not have direct Internet connectivity. For example, the accessory device is not capable of communicating with the FOTA server 102 directly and can only communicate with the FOTA server 102 through the wireless device 106. The communications between the wireless device 106 and the accessory devices 108, 110 may be either through a wired connection or a wireless connection. The wireless connection is established by the short range wireless communication 122. The short range wireless communication 122 may include Bluetooth, Digital Enhanced Cordless Telecommunication (DECT), Zigbee, MiWi, Bluetooth Low Energy (BLE), or any similar short range wireless communication technologies. The accessory device 108 includes a headset. The accessory device 110 includes a docking station. Other accessories are contemplated, such as mHealth accessories, weighing scales, heart rate monitors, etc. The docking station 110 is connected to the local area network 112. The docking station 110 may be used to establish both a physical (i.e., dock) and a network connection between the wireless device 106 and the PBX 114 via the local area network 112. In one implementation, the docking station 110 includes a physical interface (not shown) that is used to dock and connect the wireless device 106 to the PBX 114 via the local area network 112. The physical interface may include a Universal Serial Bus (USB) connection (not shown).

The wireless device 106 may be in the docked state or undocked state. In the docked state, the wireless device 106 is connected, through the docking station 110 and the local area network 112, to the PBX 114. The PBX 114 may be used to connect multiple elements within the enterprise to the PSTN 116. The PSTN 116 may further connect through a gateway 118 to the Internet 120. The elements within the enterprise may include configuration resources 124 (e.g., corporate voice mail, simple network management protocol (SNMP), light weight directory access control (LDAP), active directory (AD), etc.), and other elements (PBX Extension Devices) 126 such as fax machines, telephones, and modems. The elements connected using a PBX 114 are generally referred to as "extensions." These elements may be connected to the PBX 114 via the local area network 112. When in the undocked state, the wireless device 106 may no longer be connected to the PBX 114. To this end, the wireless device 106 may communicate with other wireless devices through wireless network 104 or with accessory devices directly through the short range wireless network 122.

A user may dock the wireless device 106 into the docking station 110 by establishing a physical connection to the docking station 110 via a USB connection or by placing the wireless device on the docking station 110. Once docked, the docking station 110 establishes a connection between the wireless device 106 and the PBX 114 via the local area network 112. If a connection to the wireless network 104 is weak or unavailable, the wireless device 106 may seek coverage through the docking station 110. The docking station 110 in turn connects the wireless device 106 to the PBX 114 through the local area network 112 which will connect the wireless device 106 to the PSTN 116 and other devices connected to the local area network 112.

Figure 2:
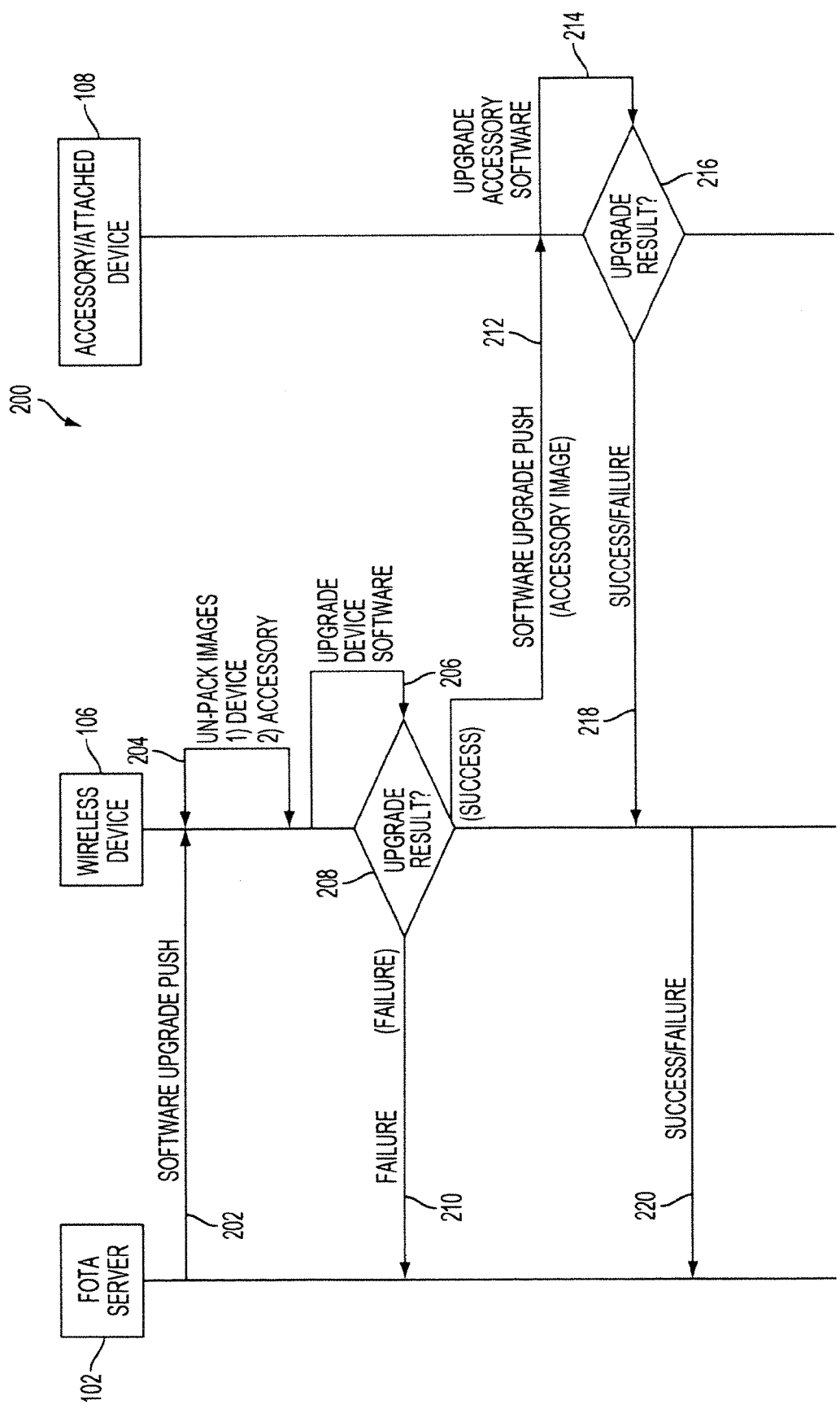
FIG. 2 illustrates an exemplary process for allowing the wireless device to function as a relay server between the FOTA server and the accessory device in communication with the wireless device as shown in FIG. 1.

FIG. 2 illustrates an exemplary process 200 for allowing the wireless device 106 to function as a relay server between the FOTA server 102 and the accessory device 108 coupled to the wireless device 106. The actors performing the process 200 include the FOTA server 102, the wireless device 106, and the accessory device 108. The FOTA server 102, the wireless device 106 and the accessory device 108 are the same as the FOTA server 102, the wireless device 106, and the accessory device 108 described with respect to FIG. 1, respectively. Therefore, they are labeled with the same reference numerals and their description is omitted here for the sake of brevity.

The process 200 begins with the FOTA server 102 pushing a software upgrade to the wireless device 106 (Step 202). In one implementation, the FOTA server 102 combines the software upgrade for the wireless device 106 and the software upgrade for the wireless device's 106 accessory (e.g., the accessory device 108) into a combined software upgrade package and forwards the combined software upgrade package to the wireless device 106. In case of combined software upgrade, the FOTA server 102 may send software upgrade for mandatory accessories. For the optional accessories, the FOTA server 102 may send software upgrade on a needed basis. The FOTA server 102 may keep track of which version of the combined software upgrade is applied to the wireless device 106. If a new combined software upgrade becomes available, the FOTA server 102 sends the new combined software upgrade to the wireless device 106. The wireless device 106 receives the combined software upgrade package and unpacks it to its individual components (e.g., a device software upgrade package and an accessory software upgrade package) (Step 204). The wireless device 106 upgrades the wireless device's 106 software in accordance with the device software upgrade (Step 206). The wireless device then evaluates the upgrade result (Step 208). If the result indicates an upgrade failure (Step 208, Failure), the wireless device 106 reports the upgrade failure to the FOTA server 102 (Step 210). In response, the FOTA server 102 may push a new software upgrade package to the wireless device 106. Alternatively, the FOTA server 102 may take no action.

If the result indicates an upgrade success (Step 208, Success), the wireless device 106 pushes the software upgrade for the accessory to the accessory device 108 (Step 212). Other implementations are contemplated. For example, in another implementation, the wireless device 106 pushes the software upgrade for the accessory device 108 to the accessory device 108 regardless of the result of software upgrade (e.g., upgrade success or failure) at the wireless device 106. Alternatively, the wireless device 106 may first push the software upgrade to the accessory device 108 and may upgrade its own software after determining that the software upgrade at the accessory device 108 has been successful. In yet another implementation, the wireless device 106 performs the software upgrade according to a specified timing. For example, the wireless device 106 performs the software upgrade either before or only after the software upgrade is implemented such as after a reboot of the wireless device 106 or after a predetermined period of time after the upgrade of the wireless device 106.

Referring again to FIG. 2, in one implementation, the wireless device 106 determines whether the accessory device 108 associated with the software upgrade image is in communication with the wireless device 106. Upon determining that the accessory device 108 is in communication with the wireless device 106, the wireless device 106 forwards the software upgrade to the accessory device 108 to enable software upgrade at the accessory device 108. In one implementation, the wireless device 106 automatically performs the software upgrade at the wireless device 106 and the accessory device 108. For example, without the user's interaction, the wireless device 106 obtains the software upgrade from the FOTA server 102 and upgrades the software module of the wireless device 106 and the software module of the accessory device 108 in accordance with the obtained software upgrade. In this connection, the wireless device 106 may display to the user that the software modules at the wireless device 106 and the accessory device 108 are upgraded or are to be upgraded.

Upon receiving the software upgrade, the accessory device 108 upgrades its software (Step 214) and evaluates the result of the upgrade (Step 216). The accessory device 108 transmits the result of the evaluation in a response (the upgrade success/failure) to the wireless device 106 (Step 218). The wireless device 106 in turn forwards the result to the FOTA server 102 (Step 220) to inform the FOTA server 102 of success or failure of the upgrade. In one implementation, the accessory device 108 only transmits a success or a failure of the upgrade and the system 100 will take action accordingly. In one implementation, if no response is received within a predetermined time from the accessory device 108, the upgrade is considered as a failure and will be retried when the wireless device 106 comes in range of the accessory device 108 again.

Figure 3A:
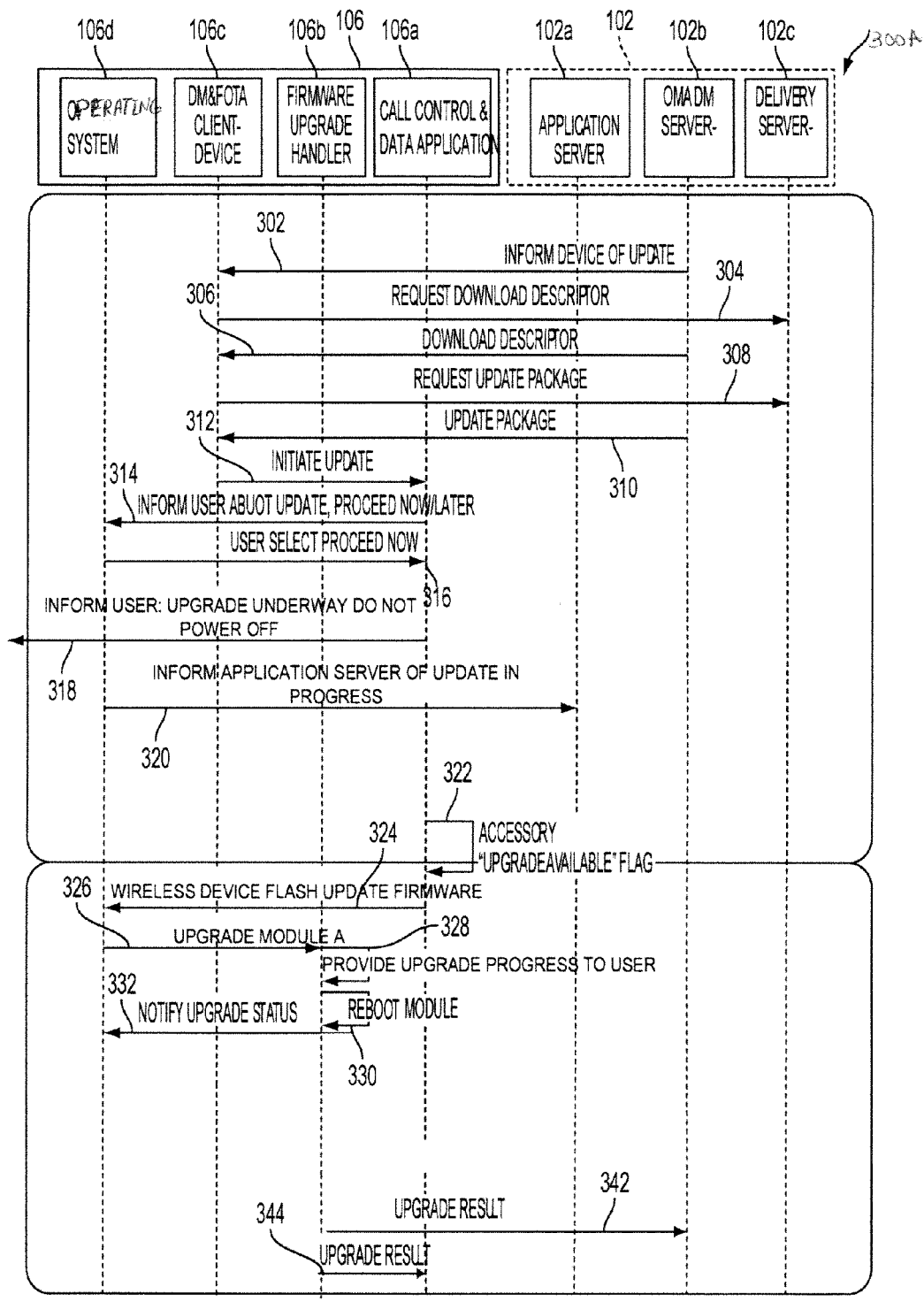
FIGS. 3A-3B illustrate a more detailed exemplary process for allowing the wireless device to function as a relay server between the FOTA server and the accessory device in communication with the wireless device.
Figure 3B:
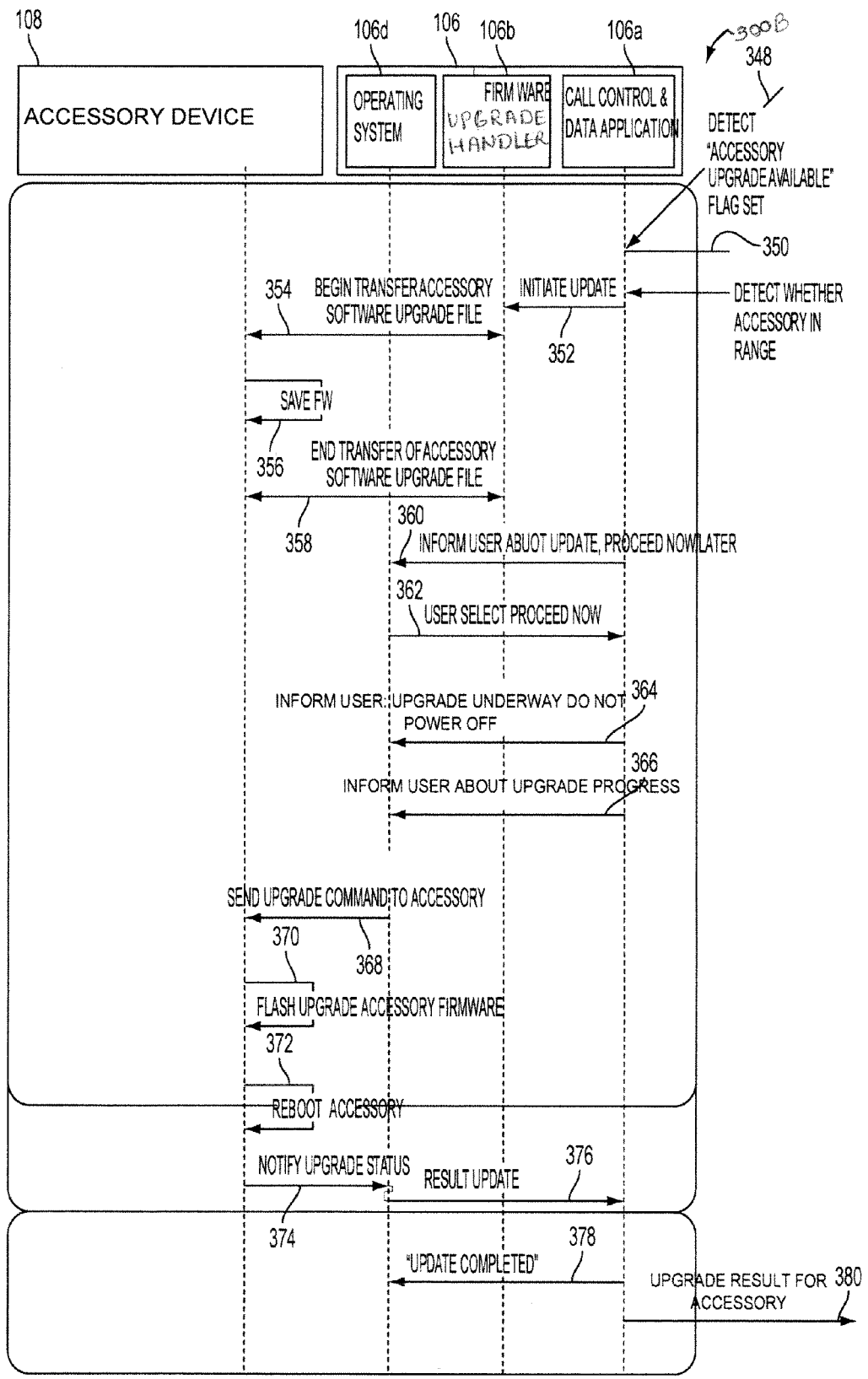

FIGS. 3A-3B illustrate a more detailed exemplary process for allowing the wireless device 106 to function as a relay server between the FOTA server 102 and the accessory device 108 coupled to the wireless device 106. Specifically, FIG. 3A illustrates an exemplary process 300A for upgrading software at the wireless device 106, and FIG. 3B illustrates an exemplary process 300B for using the wireless device 106 as a relay server for upgrading software at the accessory device 108. The actors for performing the process 300A include the FOTA server 102 and the wireless device 106. The FOTA server 102 and the wireless device 106 are similar to the FOTA server 102 and the wireless device 106 shown in FIG. 1, respectively. However, the components of the FOTA server 102 and the wireless device 106 are illustrated in more detail in FIG. 3A. Specifically, the FOTA server 102 includes an application server 102a, an Open Mobile Alliance (OMA) Device Management (DM) server 102b, and a delivery server 102c. The wireless device 106 includes a call control and data application 106a, a firmware upgrade handler 106b, DM&FOTA client 106c, and an operating system 106d.

The process 300A begins with the OMA DM server 102b informing the DM&FOTA client 106c of an upgrade (Step 302). In response, the DM&FOTA client 106c requests a download descriptor from the delivery server 102c (Step 304). The descriptor may describe the content of the software upgrade. To illustrate one specific example, the wireless device 106 has a CDMA radio for communicating with the wireless network 104 and a deck radio for communicating with the docking station 110 and devices connected to the docking station 110. To this end, the wireless device 106 has a CDMA module to implement the CDMA radio functionalities and a deck module to implement the deck functionalities. The descriptor may describe that the software upgrade is for upgrading the CDMA module and the deck module. Alternatively, the descriptor may describe that the software upgrade is an upgrade for one of the CDMA and radio modules and one of the accessories coupled to the wireless device 106. In one implementation, the FOTA server 102 only sends upgrades for mandatory accessories. For an optional accessory, when it comes in communication range of the wireless device 106, it reports its version number to the wireless device 106 and the wireless device 106 uses the version number to download from the FOTA server 102 and on a needed basis upgrades associated with the optional accessory device.

The delivery server 102c forwards the descriptor to the DM&FOTA client 106c (Step 306). The DM&FOTA client 106c reviews the descriptor and upon determination that the upgrade is necessary requests a software upgrade package from the delivery server 102c (Step 308). In response, the delivery server 102c forwards the software upgrade package to the DM&FOTA client 106c (Step 310). The DM&FOTA client 106c may attempt to validate the package to ensure that there are no errors contained therein. If the package is corrupted, the DM&FOTA client 106c may request for retransmission of the package. If the package is not corrupted, the DM&FOTA client 106c instructs the call control and data application 106a to initiate the software upgrade (Step 312). During the download of the software upgrade package to the wireless device 106, the wireless device 106 may be able to receive incoming calls or make outgoing calls. Inbound or outbound calls may cause the pause of the download and automatic resumption of the download after a certain time limit of no activity.

In response, the wireless device 106 may seek the user's approval before performing the software upgrade. To this end, the wireless device 106 displays a message to the user informing the user about the update and asking the user to proceed now or later with the update (Step 314). In one example, the wireless device 106 may ask the user to dock the wireless device 106 on the docking station 110 when the user is ready to proceed with the software upgrade. Specifically, the call control and data application 106a may send a one-line text "dock to upgrade" to the operating system 106d which will display it on the display of the wireless device 106. This is assuming the wireless device 106 has a limited functionality and display. If the wireless device 106 is more advanced, the wireless device 106 may display on its screen a message seeking the user to approve/deny the software upgrade and depending on the user's response, the wireless device 106 takes the appropriate corresponding action.

Upon selecting to proceed with the upgrade (e.g., when the user docks the wireless device 106), the operating system 106d reports to the call control and data application 106a that user has selected to proceed now (Step 316). In keeping with the previous example, the user may indicate its desire to proceed now by docking the wireless device 106. The operating system 106d may detect the wireless device 106 is docked if the battery of the wireless device 106 is placed on the charger of the docking station 110 and reports this event to the call control and data application 106a. In response, the call control and data application 106a sends a message to the user indicating that the upgrade is underway and asks the user to not power off the wireless device 106 (Step 318). The call control and data application 106a may also inform the user to undock the wireless device 106 if the user wishes to abort the upgrading.

The operating system 106d informs the application server 102a that the upgrade is in progress (Step 320). In one implementation and in keeping with the above example, the call control and data application 106a waits for a certain amount of time (e.g., 30 seconds) to detect whether the user undocks the wireless device 106. If no such response is received from the user, the call control and data application 106a initiates the upgrade. In another implementation, the call control and data application 106a immediately initiates the software upgrade and does not wait to detect whether the user undocks the wireless device 106.

In keeping with the previous example, it is assumed that the software upgrade package includes an upgrade for the CDMA module, the dock module and the accessory device. The call control and data application 106a recognizes this and sets a flag that an upgrade for the accessory is available (Step 322). The call control and data application 106a may glean this information from the package descriptor. The call control and data application sends a wireless device flash update firmware message to the operating system 106d (Step 324). The operating system 106d sends an upgrade module A command to the call control and data application 106a (Step 326).

The module A may include the deck module of the wireless device 106. The call control and data application 106a upgrades and reboots the module A (Steps 328, 330). Thereafter, the call control and data application 106a notifies the operating system 106d of the upgrade status of the module A (Step 332). The firmware upgrade handler 106b notifies the OMA DM server 102b (Step 342) and the call control and data application 106a (Step 344) of the upgrade result.

Upon receiving the report that the module has been upgraded, the operating system 106d may send an upgrade module B command to the DM&FOTA client 106c (not shown). In response, the DM&FOTA client 106c may upgrade and reboot the CDMA module. The DM&FOTA client 106c may notify the OMA DM server 102b and the call control and data application 106a of the upgrade result. During upgrading the CDMA module and the deck module, the wireless device 106 may ignore events such as, for example, incoming calls, outgoing calls, battery critical, a button press etc. Once the upgrade is complete, the wireless device 106 reports the result to the operating system 106d. This message may not be displayed if the flag that indicates an upgrade for the accessory is available is set. If the accessory upgrade is pending and the accessory is within the communication range of the wireless device 106, the wireless device 106 proceeds with upgrading the accessory as shown in the process 300B.

The process 300B begins with the call control and data application 106a detecting that the flag indicating an availability of an upgrade for the accessory is set (Step 348). The call control and data application 106a then detects whether the accessory device 108 is in communication range of the wireless device 106 (Step 350). If so, the call control and data application 106a sends a command to the firmware upgrade handler 106b to initiate the upgrade (Step 352). If the accessory device 108 is not in communication range of the wireless device 106, the wireless device 106 waits until the accessory device 108 comes within the communication range of the wireless device 106. In one implementation, the wireless device 106 may check the battery of the accessory device 108 and the battery of the wireless device 106 before initiating the transfer of the software upgrade file to the accessory device 108. If the battery level of either device is below a threshold level, the wireless device 106 may not initiate the transfer. Instead, the wireless device 106 may inform the user and may request that the user charge the device whose battery level is below the threshold.

Moving forward, assuming the accessory device 108 is in the communication range of the wireless device 106, the filmware upgrade handler 106b begins transferring the software upgrade file to the accessory device 108 (Step 354). The transfer of the software upgrade may be through the docking station 110. Specifically, the wireless device 106 may use the short range wireless communication 122 to communicate with the docking station 110 to transfer the software upgrade file for the accessory device 108. The accessory device 108 saves the software upgrade file (Step 356) and signals the end of transfer to the firmware upgrade handler 106b (Step 358).

The wireless device 106 may seek the user's approval before performing the software upgrade for the accessory device 108. To this end, the wireless device 106 displays a message to the user informing the user about the update and asking the user to proceed now or later with the update (Step 360). In one example, the wireless device 106 may ask the user to dock the wireless device 106 on the docking station 110 when the user is ready to proceed with the software upgrade for the accessory device 108. Specifically, the call control and data application 106a may send a one-line text "dock to upgrade" to the operating system 106d which will display it on the display of the wireless device 106.

Upon selecting to proceed with the upgrade (e.g., when the user docks the wireless device 106), the operating system 106d reports to the call control and data application 106a that user has selected to proceed now (Step 362). In keeping with the previous example, the user may indicate the user's desire to proceed now by docking the wireless device 106. In response, the call control and data application 106a sends a message to the user indicating that the upgrade is underway and asks the user to not power off the wireless device 106 (Step 364). The call control and data application 106a may also inform the user to undock the wireless device 106 if the user wishes to abort the upgrading.

In one implementation, the call control and data application 106a waits for a certain amount of time (e.g., 30 seconds) to detect whether the user undocks the wireless device 106. If no such response is received from the user, the call control and data application 106a sends a command to the operating system 106d to initiate the upgrade and display upgrading status to the user (Step 366). In response, the operating system 106d sends an upgrade command to the accessory device 108 over the docking station 110 (Step 368). The accessory device 108 receives the command and initiates upgrading its software (Step 370) and reboots its software (Step 372).

The accessory device 108 then notifies the operating system 106d of the result of the upgrade (Step 374). The operating system 106d in turn notifies the call control and data application 106a of the result of the upgrade (Step 376). In response, the call control and data application 106a sends an update complete message to the operating system 106d (Step 378). The call control and data application 106a also sends upgrade result for the accessory 108 to the server (Step 380). During the software upgrade of the accessory device 108, the wireless device 106 may be able to receive inbound calls, make outbound calls, and perform other functions. These tasks may cause the wireless device 106 to temporarily pause the software upgrade of the accessory and automatically resume it after completion of the specific task.

As noted above, the wireless device 106 may be a mobile station. The mobile station may be a touch screen type mobile station, a non-touch type mobile station, a general or purpose built M2M wireless device. Implementation of the upgrade relay service will involve at least some execution of programming in the mobile station as well as implementation of user input/output functions and data communications through the networks 104, 112, and or 122, from the mobile station.

Those skilled in the art presumably are familiar with the structure, programming and operations of the various types of mobile stations. However, for completeness, it may be useful to consider the functional elements/aspects of a touch screen type mobile station and a non-touch type mobile station, at a high-level.

Figure 4:
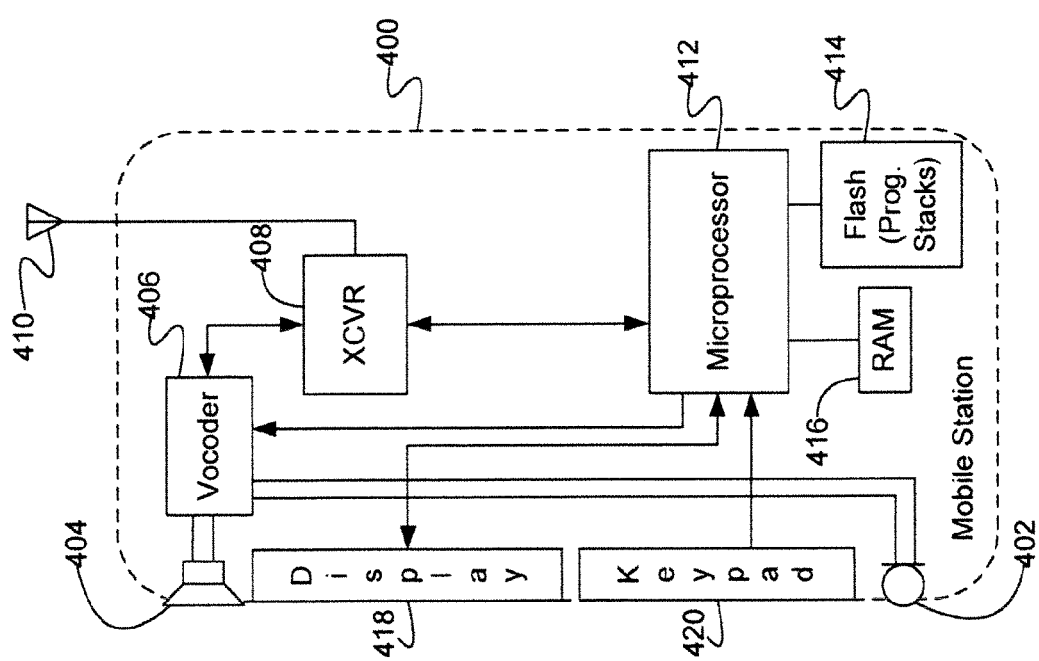
FIG. 4 is a high-level functional block diagram of an exemplary non-touch type mobile station which may function as a relay server for upgrading software of the accessory device shown in FIG. 1.

For purposes of such a discussion, FIG. 4 provides a block diagram illustration of an exemplary non-touch type mobile station 400. Although the mobile station may be a smartphone or may be incorporated into another device, such as a personal digital assistant (PDA) or the like, for discussion purposes, the illustration shows the mobile station 400 is in the form of a handset. The handset embodiment of the mobile station 400 functions as a normal digital wireless telephone station. For that function, the station 400 includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 400 also includes at least one digital transceiver (XCVR) 408. Today, the handset 400 would be configured for digital wireless communications using one or more of the common network technology types. The concepts discussed here encompass embodiments of the mobile station 400 utilizing any digital transceivers that conform to current or future developed digital wireless communication standards. The mobile station 400 may also be capable of analog operation via a legacy network technology.

The transceiver 408 provides two-way wireless communication of information, such as vocoded speech samples and/or digital information, in accordance with the technology of the network 404. The transceiver 408 also sends and receives a variety of signaling messages in support of the various voice and data services provided via the mobile station 13a and the communication network. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

The mobile station 400 includes a display 418 for displaying messages, menus or the like, call related information dialed by the user, calling party numbers, etc., including messages relating to the upgrading software at the mobile station 400 and at the accessory device in communication with the mobile station 400. A keypad 420 enables dialing digits for voice and/or data calls as well as generating selection inputs, for example, as may be keyed-in by the user based on a displayed menu or as a cursor control and selection of a highlighted item on a displayed screen. The display 418 and keypad 420 are the physical elements providing a textual or graphical user interface. Various combinations of the keypad 420, display 418, microphone 402 and speaker 404 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during upgrade relay service.

A microprocessor 412 serves as a programmable controller for the mobile station 400, in that it controls all operations of the mobile station 400 in accord with programming that it executes, for all normal operations, and for operations involved in the upgrade relay procedure under consideration here. In the example, the mobile station 400 includes flash type program memory 414, for storage of various "software" or "filmware" program routines and mobile configuration settings, such as mobile directory number (MDN) and/or mobile identification number (MIN), etc. The mobile station 400 may also include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, call processing software and vocoder control software, and any of a wide variety of other applications, such as client browser software and short message service software. The memories 414, 416 also store various data, such as telephone numbers and server addresses, downloaded data such as multimedia content, and various data input by the user. Programming stored in the flash type program memory 414, sometimes referred to as "firmware," is loaded into and executed by the microprocessor 412.

As outlined above, the mobile station 400 includes a processor, and programming stored in the flash memory 414 configures the processor so that the mobile station is capable of performing various desired functions, including in this case the functions involved in the technique serving as a relay server for upgrading the software at the accessory device in communication with the mobile station 400.

Figure 5:
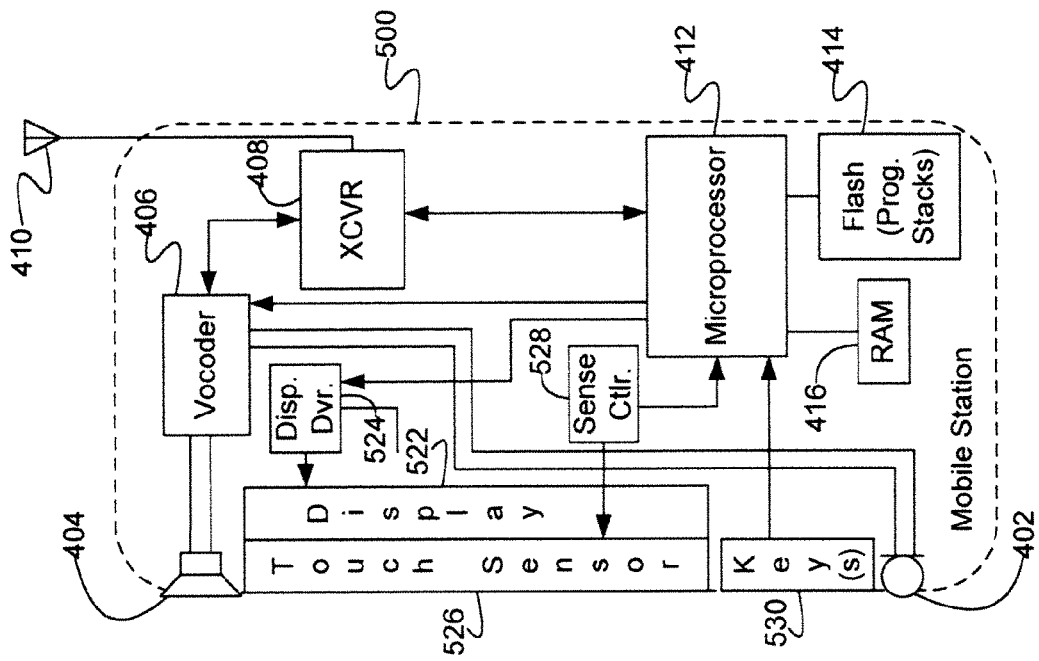
FIG. 5 is a high-level functional block diagram of an exemplary touch screen type mobile station which may function as a relay server for upgrading software of the accessory device shown in FIG. 1.

For purposes of such a discussion, FIG. 5 provides a block diagram illustration of an exemplary touch screen type mobile station 500. Although possibly configured somewhat differently, at least logically, a number of the elements of the exemplary touch screen type mobile station 500 are similar to the elements of mobile station 400, and are identified by like reference numbers in FIG. 4. For example, the touch screen type mobile station 500 includes a microphone 402, speaker 404 and vocoder 406, for audio input and output functions, much like in the earlier example. The mobile station 400 also includes at least one digital transceiver (XCVR) 408, for digital wireless communications, although the mobile station 500 may include an additional digital or analog transceiver. The concepts discussed here encompass embodiments of the mobile station 500 utilizing any digital transceivers that conform to current or future developed digital wireless communication standards. As in the mobile station 500, the transceiver 408 provides two-way wireless communication of information, such as vocoded speech samples and/or digital information, in accordance with the technology of the wireless network 104. The transceiver 408 also sends and receives a variety of signaling messages in support of the various voice and data services provided via the mobile station 500 and the communication network. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

As in the example of station 400, a microprocessor 412 serves as a programmable controller for the mobile station 500, in that it controls all operations of the mobile station 500 in accord with programming that it executes, for all normal operations, and for operations involved enabling the mobile station 500 to act as a relay server for upgrading an accessory device in communication with the mobile station 500. In the example, the mobile station 500 includes flash type program memory 414, for storage of various program routines and mobile configuration settings. The mobile station 500 may also include a non-volatile random access memory (RAM) 416 for a working data processing memory. Of course, other storage devices or configurations may be added to or substituted for those in the example. Hence, outlined above, the mobile station 500 includes a processor, and programming stored in the flash type program memory 414 configures the processor so that the mobile station is capable of performing various desired functions, including in this case the functions involved in the technique for enabling the mobile station 500 to act as a relay server.

In the example of FIG. 4, the user interface elements included a display and a keypad. The mobile station 500 may have a limited number of keys 530, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 500 includes a display 522, which the microprocessor 412 controls via a display driver 524, to present visible outputs to the device user. The mobile station 500 also includes a touch/position sensor 526. The touch/position sensor 526 is relatively transparent, so that the user may view the information presented on the display 522. A sense circuit 528 senses signals from elements of the touch/position sensor 526 and detects occurrence and position of each touch of the screen formed by the display 522 and touch/position sensor 526. The sense circuit 528 provides touch position information to the microprocessor 412, which can correlate that information to the information currently displayed via the display 522, to determine the nature of user input via the screen.

The display 522 and touch/position sensor 526 (and possibly one or more keys 530, if included) are the physical elements providing the textual and graphical user interface for the mobile station 500. The microphone 402 and speaker 404 may be used as additional user interface elements, for audio input and output.

The structure and operation of the mobile stations 400 and 500, as outlined above, were described to by way of example, only.

As shown by the above discussion, functions/programs relating to enabling the wireless device to act as a relay server may be implemented on computers connected for data communication via the components of a packet data network as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data, e.g. files used for enabling upgrade relay service. The software code is executable by the general-purpose computer that functions as the FOTA server and/or that functions as a wireless device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling the wireless device to act as a relay server for upgrading software of an accessory in communication range with the wireless device, in essentially the manner performed in the implementations discussed and illustrated herein.

Figure 6:
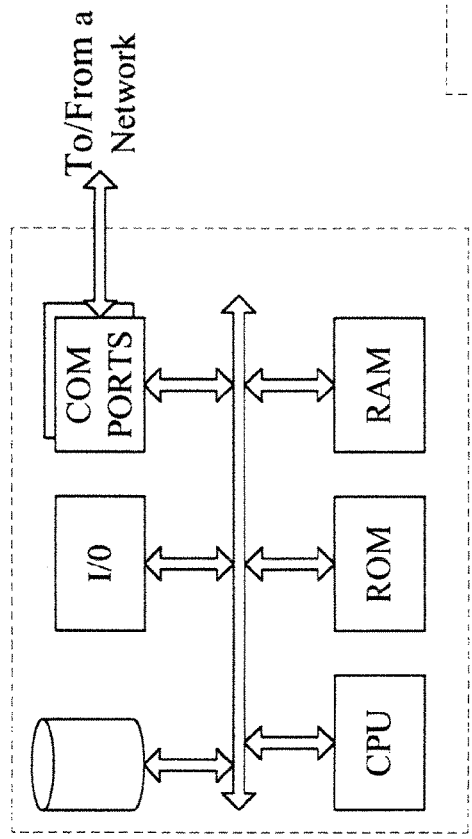
FIG. 6 is a simplified functional block diagram of a computer that may be configured as a host or server, for example, to function as the FOTA server in the system of FIG. 1.
Figure 7:
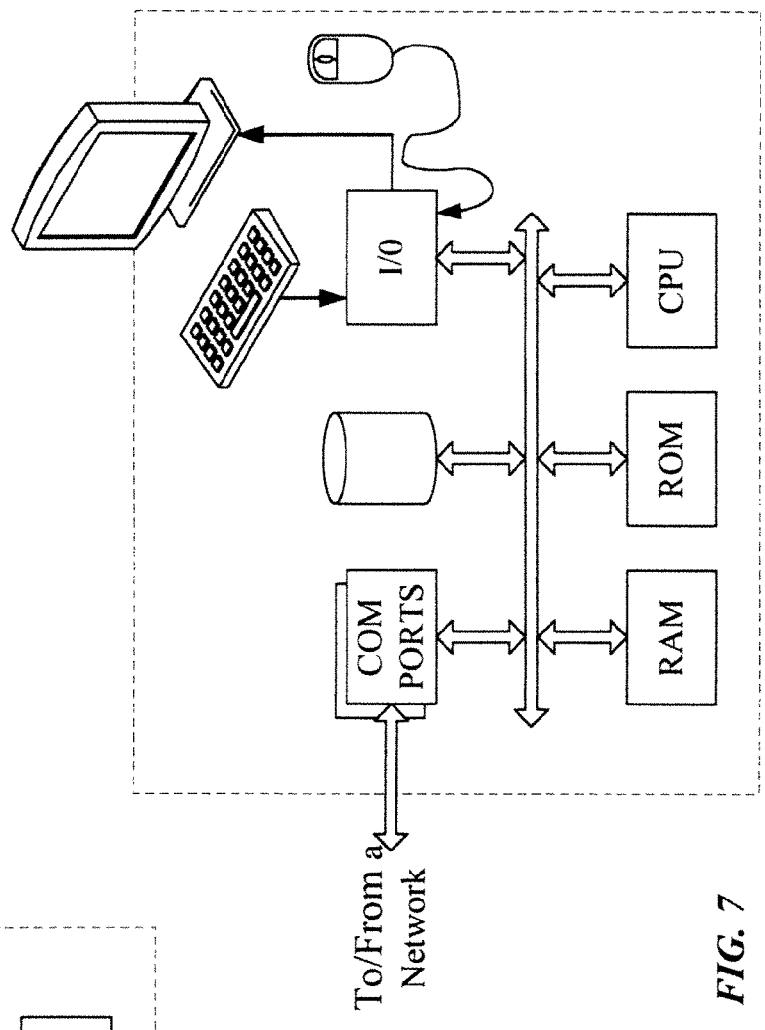
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of enabling the wireless device to act as a relay server for upgrading an accessory in communication with the wireless device outlined above may be embodied in programming Program aspects of the technology may be thought of as "products" or "articles of manufacture" typically in the form of executable code and/or associated data that is carried on or embodied in a type of machine readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication service provider into the computer platform of the wireless device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media includes, for example, optical or magnetic disks, such as any of the storage devices in any computer(s) or the like, such as may be used to implement the methodology for enabling the wireless device to act as a relay server for an accessory in communication with the wireless device, etc. shown in the drawings. Volatile storage media includes dynamic memory, such as the main memory of such a computer platform. Tangible transmission media includes coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
receiving, at a wireless device, from a Firmware Over the Air (FOTA) server at a wireless network, a notification of an upgrade that includes information related to a combined software upgrade package;
responsive to the notification, receiving, at the wireless device, directly from the FOTA server and prior to the wireless device being in communication with an accessory device, the combined software upgrade package including a first software upgrade and a second software upgrade for upgrading the wireless device and the accessory device respectively,
in response to receiving the combined software upgrade package and the upgrade information:
upgrading the wireless device according to the first software upgrade that is received by the wireless device from the FOTA server;
determining whether the upgrade of the wireless device according to the first software upgrade was successful;
determining whether a flag is set in the wireless device indicating availability of the second software upgrade for upgrading the accessory device;
automatically determining, at the wireless device, whether the accessory device is in communication with the wireless device;
upon determining that the wireless device was successfully upgraded according to the first software upgrade, that the flag is set, and that the accessory device is in communication with the wireless device, forwarding, from the wireless device and to the accessory device, the second software upgrade to upgrade the accessory device
in response to a notification of the upgrade failure from the accessory device, receiving, from the FOTA server and at the wireless device, a third software upgrade for the accessory device;
forwarding the third software upgrade to the accessory device;
responsive to forwarding the third software upgrade to the accessory device, receiving, from the accessory device and at the wireless device, another notification of an upgrade success or upgrade failure according to the third software upgrade; and
forwarding the other notification of the upgrade success or failure to the FOTA server.

2. The method of claim 1, further comprising:
receiving, at the wireless device and from the accessory device, a notification of an upgrade success or an upgrade failure for the second software upgrade; and
forwarding the notification of the upgrade success or the upgrade failure from the wireless device to the FOTA server.

3. The method of claim 2, wherein:
receiving the notification of the upgrade success or the upgrade failure includes receiving the notification of the upgrade failure, and
forwarding the notification of the upgrade success or the upgrade failure includes forwarding the notification of the upgrade failure to the Firmware Over the Air (FOTA) server at the wireless network.

4. The method of claim 1, wherein the accessory device includes a short range wireless communication enabled device in communication with the wireless device over short range wireless communication or a wired device in communication with the wireless device over a physical connection.

5. The method of claim 1, wherein the second software upgrade includes a software upgrade for multiple accessory devices having a similar function.

6. The method of claim 1, wherein:
the second and third software upgrades each includes respective software upgrades for the accessory device and a second accessory device,
the automatically determining includes automatically determining whether the accessory device and the second accessory device are in communication with the wireless device, and
upon determining that the accessory device and the second accessory device are in communication with the wireless device, automatically forwarding, from the wireless device, the respective software upgrades to the accessory device and the second accessory device to upgrade the accessory device and the second accessory device.

7. The method of claim 1, wherein:
the wireless device includes a Code Division Multiple Access (CDMA) module configured to communicate with the wireless network and a dock module configured to communicate with a docking station that is configured to connect the wireless device with another accessory device, and
the combined software upgrade package received at the wireless device includes a CDMA software upgrade, a dock software upgrade, and an accessory software upgrade for the other accessory device.

8. The method of claim 7, further comprising upgrading the CDMA module in accordance with the CDMA software upgrade, the dock module in accordance with the dock software upgrade and the other accessory device in accordance with the accessory software upgrade.

9. A wireless device comprising:
a processor; and
a memory storing executable instructions for causing the processor to:
receive, at the wireless device, from a Firmware Over the Air (FOTA) server at a wireless network, a notification of an upgrade information that includes information related to a combined software upgrade package; responsive to the notification, receive, directly from the FOTA server, the combined software upgrade package including a first software upgrade and a second software upgrade for upgrading the wireless device and an accessory device respectively, and prior to being in communication with the accessory device;

responsive to receiving the combined software upgrade package and the upgrade information:
upgrade the wireless device according to the first software upgrade that is received by the wireless device from the FOTA server;
determine whether the wireless device is upgraded according to the first software upgrade, and
determine whether a flag is set in the wireless device that indicates availability of the second software upgrade for upgrading the accessory device;
automatically determine whether the accessory device is in communication with the wireless device;
upon determining that the wireless device is upgraded according to the first software upgrade, that the flag is set, and that the accessory device is in communication with the wireless device, forward to the accessory device the second software upgrade to upgrade the accessory device;
determine whether the accessory device was upgraded according to the second software upgrade;
upon determining that the accessory device was not successfully upgraded, receive, from the FOTA server and at the wireless device, a third software upgrade for the accessory device;
forward the third software upgrade to the accessory device;
responsive to forwarding the third software upgrade to the accessory device, receive, from the accessory device and at the wireless device, another notification of an upgrade success or failure according to the third software upgrade; and
forward the other notification of the upgrade success or failure to the FOTA server.

10. The wireless device of claim 9, wherein the memory further stores executable instructions for causing the processor to:
receive from the accessory device a notification of an upgrade success or an upgrade failure for the second software upgrade; and
forward the notification of the upgrade success or the upgrade failure to the FOTA server at the wireless network.

11. The wireless device of claim 10, wherein the memory further stores executable instructions for causing the processor to:
forward the notification of the upgrade success to the Firmware Over the Air (FOTA) server at the wireless network upon receiving the notification of the upgrade success.

12. The wireless device of claim 10, wherein the memory further stores executable instructions for causing the processor to:
forward the notification of the upgrade failure to the Firmware Over the Air (FOTA) server at the wireless network upon receiving the notification of the upgrade failure.

13. The wireless device of claim 9, wherein the accessory device includes a short range wireless communication enabled device in communication with the wireless device over short range wireless communication or a wired device in communication with the wireless device over a physical connection.

14. The wireless device of claim 9, wherein the second and third software upgrades each includes a software upgrade for multiple accessories having a similar function.

15. A method comprising:
receiving, at a wireless device, from a Firmware Over the Air (FOTA) server at a wireless network, a notification of an upgrade information indicating availability of a combined software upgrade package; responsive to the notification, receiving, directly at the wireless device and from the FOTA server, the available combined software upgrade package including a first software upgrade and a second software upgrade for upgrading the wireless device and the accessory device respectively, and prior to being in communication with the accessory device;

in response to receiving the combined software upgrade package and the notification:
upgrading the wireless device according to the first software upgrade that is received by the wireless device from the FOTA server;
determining whether the wireless device is upgraded according to the first software upgrade, and
determining whether a flag is set in the wireless device indicating availability of the second software upgrade for upgrading the accessory device;
automatically determining, at the wireless device, whether the accessory device is in a communication range of the wireless device;
upon determining that the wireless device is upgraded according to the first software upgrade, that the flag is set, and that the accessory device is in the communication range of the wireless device, forwarding, from the wireless device to the accessory device, the obtained second software upgrade to upgrade the accessory device;
determining whether the accessory device was upgraded according to the second software upgrade;
upon determining that the accessory device was not successfully upgraded, receiving, from the FOTA server and at the wireless device, a third software upgrade for the accessory device;
forwarding the third software upgrade to the accessory device;
responsive to forwarding the third software upgrade to the accessory device, receiving, from the accessory device and at the wireless device, another notification of an upgrade success or failure according to the third software upgrade; and
forwarding the other notification of the upgrade success or failure to the FOTA server.

16. The method of claim 1, wherein the accessory device is associated with the wireless device and is incapable of wireless connection to the wireless network.

17. The method of claim 1, further comprising:
providing, to at least one of a user of the wireless device or to the FOTA server at the wireless network, a notification of an upgrade status of at least one of the first software upgrade or the second software upgrade.

18. The method of claim 1, wherein the accessory device is selected from a group consisting of: a headset, a heart rate monitor, and a weighing scale and, wherein the selected accessory device communicates with the wireless device via Bluetooth communication.

19. The wireless device of claim 9, wherein the accessory device is selected from a group consisting of: a headset, a heart rate monitor, and a weighing scale and, wherein the wireless device includes a Bluetooth transceiver for communicating with the accessory device via Bluetooth communication.

* * * * *